Dec. 2, 1958 L. B. HARRIS 2,862,390
LOCK AND OPERATING MECHANISM FOR DEFERRED ACTION BATTERIES
Filed Nov. 7, 1955 2 Sheets-Sheet 1
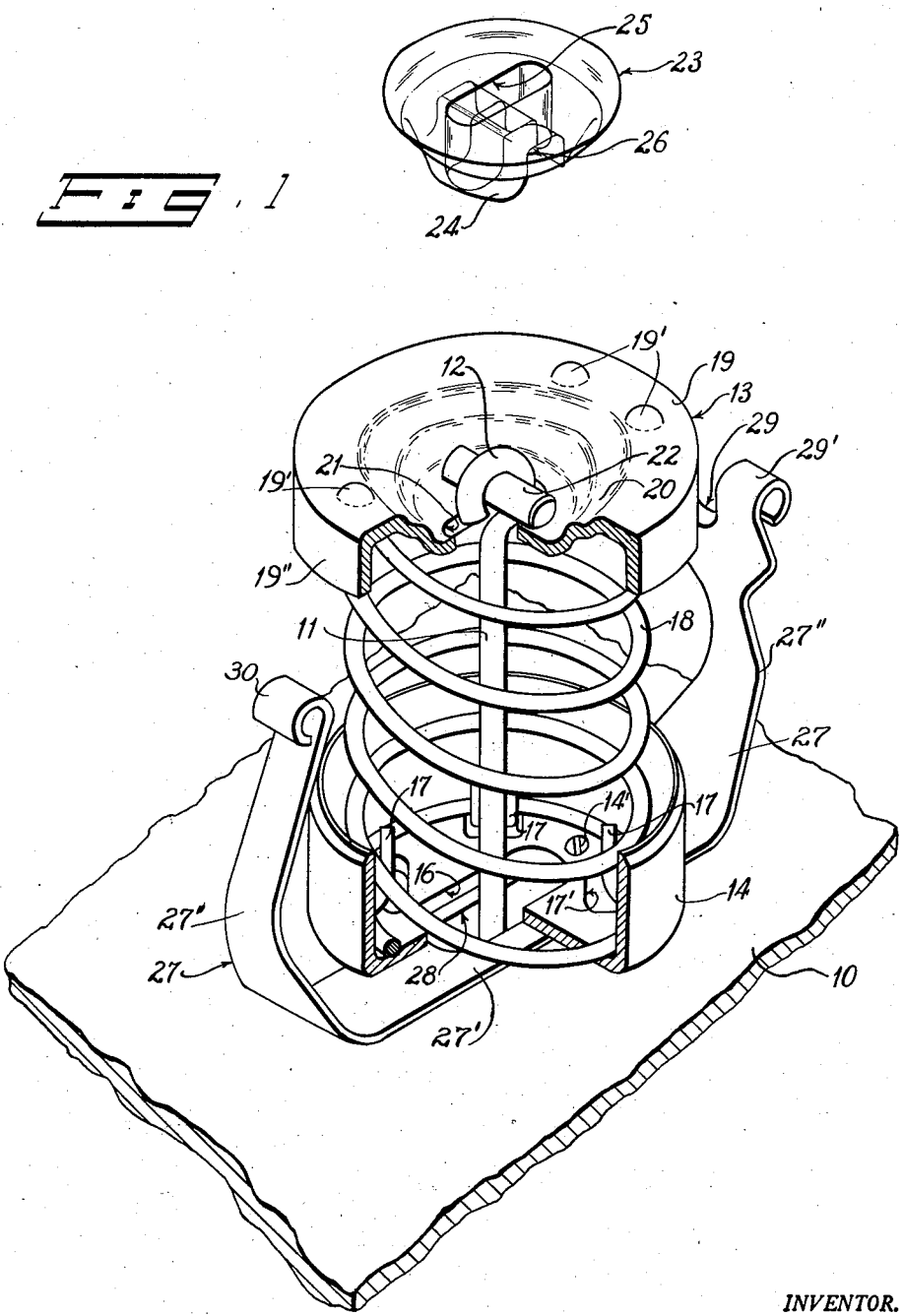
INVENTOR.
Lewis B. Harris
BY
ATTORNEY.

Dec. 2, 1958 L. B. HARRIS 2,862,390
LOCK AND OPERATING MECHANISM FOR DEFERRED ACTION BATTERIES
Filed Nov. 7, 1955 2 Sheets-Sheet 2
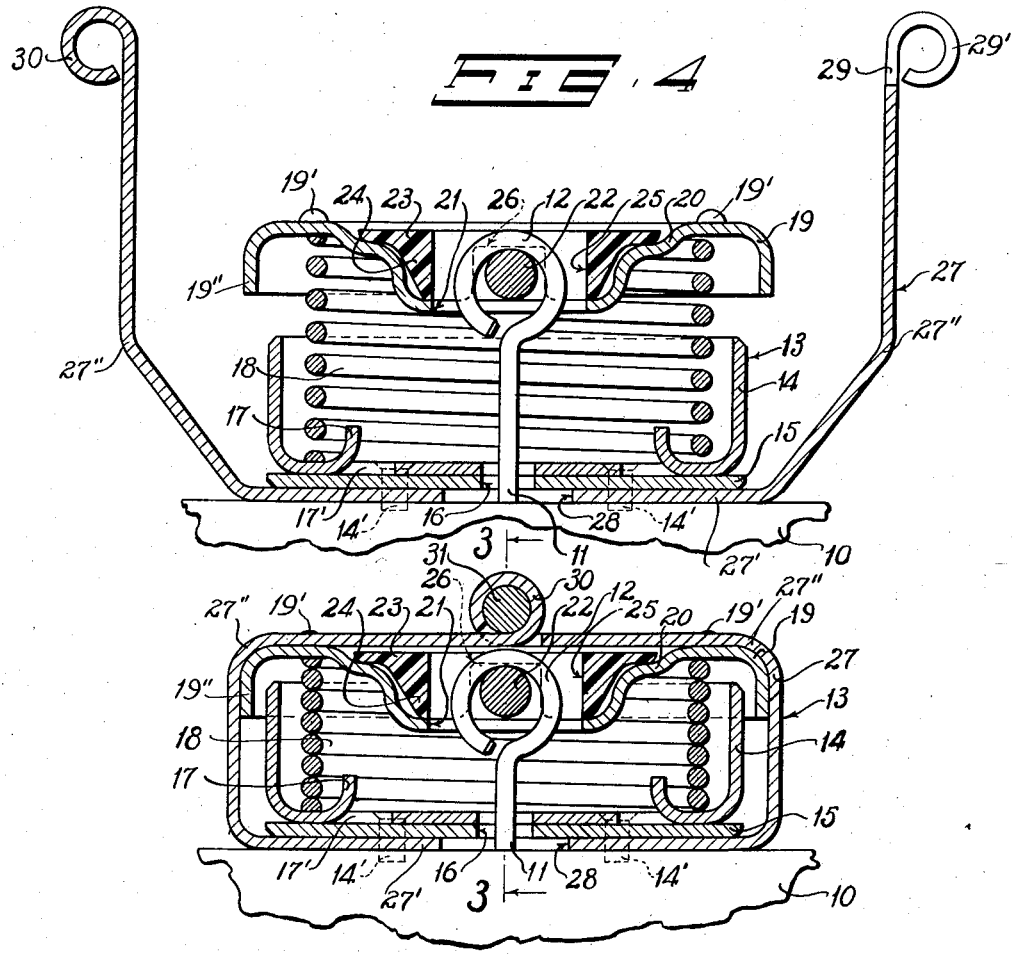
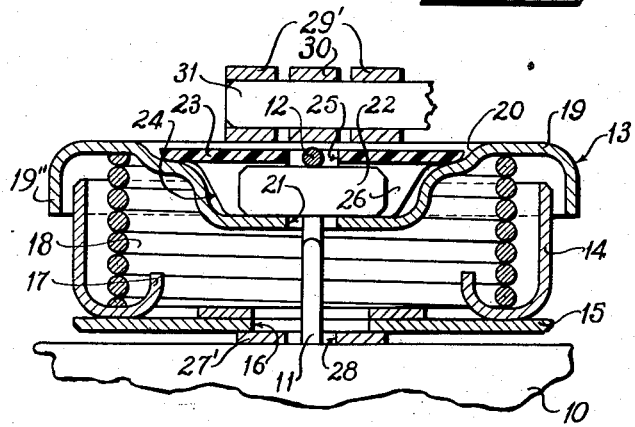
INVENTOR.
Lewis B. Harris
BY
ATTORNEY.

12,862,390
Patented Dec. 2, 1958

2,862,390

LOCK AND OPERATING MECHANISM FOR DEFERRED ACTION BATTERIES

Lewis Byron Harris, Babylon, N. Y., assignor to Republic Aviation Corporation, Farmingdale, N. Y., a corporation of Delaware Application November 7, 1955, Serial No. 545,336

10 Claims. (Cl. 74—2)

This invention relates generally to locking devices and more particularly to a lock and operating mechanism for the initiator of a power device, such as a deferred action battery, to secure said initiator against actuation and operative to release said lock and simultaneously actuate said initiator.

Among other things, the invention contemplates a lock and operating mechanism of this type which is a self-contained unit designed to be so attached to the body of the power device or battery that it overlies and fully encloses or houses the initiator projecting therefrom.

Moreover, the connection of the mechanism to the initiator or plunger of the power device is such that the possibility of accidental or unintentional release of said plunger with the consequent initiation or operation of the power device or battery is substantially eliminated.

In addition, the operation of this device radically changes the appearance of the assembly so that the expended condition of the power device or battery is readily apparent upon superficial inspection.

With the above and other objects in view, as will be apparent, this invention consists in the construction, combination and arrangement of parts all as hereinafter more fully described, claimed and illustrated in the accompanying drawings, wherein:

Fig. 1 is an exploded view of the present lock and operating mechanism in perspective elevation and partly in section to show the relative positions of its components after operation and the manner in which it is connected to the initiator or plunger of a power device or battery, only a fragment thereof being illustrated;

Fig. 2 is a transverse section of the instant device to show the assembly in its locked position whereby the plunger or initiator of the power device or battery is secured against actuation;

Fig. 3 is a section taken along line 3—3 of Fig. 2; and

Fig. 4 is a view, like Fig. 2, to show the release of the device and the actuation of the initiator thereby.

While the present invention is designed and adapted for use generally wherever it is desired to positively lock the initiator of a power device against accidental or unintentional operation, it finds especial utility in conjunction with deferred-action batteries. In these batteries the electrolyte is separated or isolated from the electrode plates until such time as electrical energy from the battery is required. Initiators of various types including plungers have been employed to effect communication between the electrolyte and the electrodes to activate or energize the battery.

Deferred-action batteries have been employed extensively and one of the more important applications is in connection with emergency circuits, i. e. circuits which are normally inoperative and stand by for use only when needed under relatively abnormal or emergency conditions. Advantages of such batteries over the more common type of battery reside in the fact that they are inert until the initiator thereof is actuated to activate or energize the battery. Since there is no normal deterioration of the battery until the operation of its initiator, there is no need to periodically check the battery in order to determine that it is fully charged and ready for operation. Thus, deferred-action batteries are more dependable.

At the same time, however, in order to render the mechanism fool-proof, precautions are necessary to prevent the accidental actuation of the initiator and consequent activation of the battery whereby its electrical energy may be prematurely expended. The importance of this is apparent when it is remembered that these batteries are usually in closed and sealed packages, making it impossible to determine by superficial observation whether or not the initiator in fact has been actuated and the energy of the battery expended in whole or in part.

It is equally important that activation or energization of the battery not be delayed due to an additional step or operation required in first releasing any means which may be provided to prevent the premature and unintentional activation of the battery.

The present invention, therefore, has in view solution of the foregoing as well as other problems. To this end a lock mechanism or assembly is proposed which comprises means to retain the initiator of a deferred-action battery in a fixed position whereby the battery is maintained inoperative or inactive. This retaining means or lock may be released whereupon the initiator is automatically and simultaneously operated thereby activating or energizing the battery. Thus, in a single operation, the positive lock maintaining the initiator against accidental or unintentional operation may be released and the battery simultaneously and automatically activated.

When the deferred-action battery is activated in the above manner, the invention contemplates such an extension or expansion of the lock assembly that a substantial change in its appearance results to thereby indicate, upon even superficial observation, that the battery has been activated and that perhaps its electrical energy has been expended.

Referring more particularly now to the drawing, 10 designates a power device or deferred-action battery from which an initiator or plunger 11 projects. At its outer end the plunger 11 terminates in a loop or eye 12. Activation of the battery 10 is effected by an outward pull on the plunger 11.

The present lock and operating mechanism generally designated as 13 is adapted to overlie and house the plunger 11 and on occasion pull the plunger outwardly to activate the battery 10. This lock mechanism or assembly 13 comprises a cup 14 adapted to be secured by any suitable means 14' with its bottom flush against the top wall of the battery 10 adjacent to and surrounding the plunger 11. A disk 15 may be disposed beneath and exteriorly of the bottom of the cup 14 and be there secured to both the bottom of the cup and the top wall of the battery 10, the attaching means 14' being employed for that purpose. Both the bottom of the cup 14 and the disk 15 are pierced centrally by elongated slots 16 so that they may pass over the loop or eye 12 of the plunger or initiator 11 in mounting the cup 14 and disk 15 on the battery 10.

Prior to securing the disk 15 to the bottom of the cup 14, a series of rectangular tongues 17 is formed or struck from the bottom of the cup. Each of these tongues 17 remains integral with the cup 14 at one of its sides, while its other three sides or edges are free, whereby the tongues may be bent upwardly or inwardly of the cup. Thus the series of tongues 17 are concentrically disposed within the cup 14 spaced from and substantially parallel to the wall of the cup. The space defined by the tongues 17 and the wall of the cup 14 serves to accommodate and retain a compression spring 18 housed within the cup 14.

At its outer or open end the cup 14 is closed by a cap 19 which has a diameter which is greater than that of the cup 14. This cap 19 is provided with a peripheral depending flange 19″ adapted to overlap and telescope with the wall of the cup 14 when the spring 18 is fully compressed. Thus, the spring 18, when within the cup 14, abuts the cap 19 at one end and the bottom of the cup 14 at its other end and when compressed, serves to force the cap 19 outwardly or away from the cup 14, i. e. from the position shown in Figs. 2 and 3 to the position shown in Figs. 1 and 4.

The center portion of the cap 19 is depressed to create a pocket or recess 20, projecting inwardly of the cup 14. The base of this pocket or recess 20 is pierced by an elongated slot 21 for the passage therethrough of the loop or eye 12 of the plunger or initiator 11 when said cap 19 is forced inwardly of the cup 14 against the action of the compression spring 18. When the cap 19 is so disposed, the loop 12 of the plunger 11 extends outwardly thereof through the slot 21. A pin 22 may then be passed through the loop 12 of the plunger 11 with its ends projecting laterally beyond the loop 12 to rest upon the outer face of the pocket or recess 20 of the cap 19 on each side of the slot 21. Thus, the cap 19 is connected to the plunger 11 to exert an outward pull on the plunger under the influence of the compressed spring 18 when the same is free to expand.

A plug 23 of synthetic resin or any other suitable material overlies and encloses the pin 22 and loop 12 of the plunger 11 and substantially fills the pocket 20 in the cap 19. To this end, plug 23 is circular and shaped peripherally to conform substantially with the contour of the pocket 20 in the cap 19. Hence, the outer face of the plug 23, when in the recess 20, forms a smooth continuation of the outer face of the cap 19 surrounding the pocket 20.

A lobe 24 is formed on and projects from the inner face of the plug 23 centrally thereof to be matingly received within and fill the pocket 20 of the cap 19. A central elongated slot 25 pierces the plug 23. This slot 25 is dimensioned to conform to and register with the slot 21 in the cap 19 and thereby permits the passage of the loop or eye 12 of the plunger 11 therethrough when the plug is disposed within the recess 20. A groove 26, disposed at right angles to the slot 25, is formed or created in the lobe 24 of the plug 23 to accommodate the ends of the pin 22 and thereby allow the plug to be fully inserted into the depression 20 of the cap 19.

When the cup 14 and the cap 19 are toward each other and against the action of the spring 18, thereby becoming fully telescoped, the pin 22 overlying the cap 19 connects said cap to the plunger or initiator 11 after which the plug 23 may be placed in the pocket 20 to complete the assembly of the instant lock and operating device.

Unless means is provided to lock the cap 19 in its assembled position telescoped with the cup 14, the spring 18 will act to lift the cap and elevate the initiator 11 as soon as the assembling pressure is removed from the cap. To prevent this, a spring latch 27 is positioned on each side of the cup 14 to be wrapped around the assembly and extend over the cap 19. These latches 27 at their inner ends are integrally connected to and by a flat base 27′ having a longitudinal slot 28 to permit it to be passed over the plunger 11, the slot 28 being in substantial registration with the slots 16. The base 27′ rests flush on the wall of the battery 10 between the disk 15 or the bottom of the cup 14 and the battery 10 where it is secured against movement relative to said battery by the attaching means 14′. With the base 27′ so disposed, the diametrically disposed latches 27, unless restrained, assume positions generally normal to the base 27′ (see Figs. 1 and 4) and approximately parallel to the initiator or plunger 11 due to the spring action thereof with respect to said base.

Medially of its length, each latch 27 is permanently bent or deflected, as at 27″, so that the outer end portions thereof are substantially parallel to each other and to the wall of the cup 14 and the flange 19″ of the cap 19. These outer end portions of the latches 27 are adapted to overlie the outer face of the cap 19 and rest flush against the outer surface of the cap 19. This positioning of the end portions of the latches 27 over the cap 19 is against the inherent and normal spring action thereof.

The end of one latch 27 is bifurcated, as at 29, and each arm of such bifurcation 29 is rolled or bent upon itself to create a loop 29′. The loops 29′ thus formed are aligned transversely to define a continuous passage. The corresponding end of the opposed latch 27 is rolled or bent upon itself to create a single loop 30. The loop 30 is approximately equal in size and shape to the loops 29′ and is adapted to be received between the arms of the bifurcation 29 whereby all of the loops 29′ and 30 register and align one with the other when the end portions of the latches 27 meet over the cap 19. In order to aid in the proper registration of the loops 29′ and 30 when the latches 27 are disposed over the cap 19, guide means such as the nodes or projections 19′ are formed on the outer face of the cap 19. These nodes 19′, if necessary, further serve to retain the latches 27 in a position centrally of the cap 19.

When the loops 29′ and 30 are positioned in registration, a lock pin 31 is passed through them all to secure the latches 27 around the telescoped cup 14 and cap 19 to clampingly engage and maintain the assembly against the action of the compression spring 18. This pin 31 may be attached to or formed on the end of a cable or like actuator (not shown) so that it may be withdrawn from some remote control point, such as the cockpit of the airplane, and thereby release the latches 27 and permit them to remove themselves from over the cap 19.

Thus, the lock and operating mechanism 13 is fixedly mounted on the wall of the power device 10 to thereby form a part thereof. It encloses or houses within it the initiator 11 of the power device or battery and locks such initiator against movement. In this way the initiator is unexposed and positively locked against inadvertent or unintentional actuation. When it is desired to activate or energize the power device or battery 10, pin 31 is withdrawn from the loops 29′ and 30 by any suitable agency and the initiator 11 is actuated automatically by the action of the spring 18.

Once the lock and operating mechanism 13 has been released by the withdrawal of the pin 31, the expanded condition of the device, as well as the positions of the ends of the latches 27, indicates at a glance that the power device or battery 10 has been energized or activated and that its electrical energy has been or is being expended.

What is claimed is:

1. A lock and operating mechanism for the initiator of a power device comprising a pair of telescoping members adapted to be attached externally to said power device to overlie and enclose its initiator, engagement means carried by said initiator at the outer extremity thereof in constant abutment against one of said members to prevent movement of said one member outwardly of said initiator, means interposed between said members and operable to separate them whereby outward movement of said one member simultaneously moves said initiator to activate the power device, and a releasable lock connecting said members one to the other in the telescoped position against the action of said means.

2. A lock and operating mechanism for the projecting initiator of a deferred-action battery comprising a fixed member connected to the exterior wall of the battery and surrounding said initiator, a movable member normally telescoping with the fixed member for coaction therewith to overlie and enclose the initiator of the battery, an engagement between the side of the movable member outermost from the battery and the outer extremity of said initiator whereby outward movement of said member relative to the battery concurrently actuates said initiator, resilient operating means interposed between said members and compressed when the members are fully telescoped to thereby separate said members by moving the movable member away from the fixed member when free to operate, and a releasable lock connecting the movable member to the fixed member in the telescoped position until released.

3. A lock and operating mechanism for a power device comprising an assembly adapted to be removably attached to the power device including a cup disposed with its base in abutment with the external wall of said device and surrounding the initiator thereof, a movable cap overlying the open end of said cup, a compression spring disposed within the cup and operative against said cap to force it away from the cup, means connecting the outer extremity of the initiator to the cap whereby the initiator is actuated upon the operation of the compression spring on the cap, and a releasable lock to engage and retain the cap against the operation of the compression spring.

4. A lock and operating mechanism for the initiator of a deferred-action battery comprising a cup having an opening in its bottom for the passage of the initiator and adapted to be removably secured to the external wall of the battery, a cap disposed over the outer open end of said cup, a coil spring surrounding the initiator and interposed between said cup and cap and acting to force the cap away from the cup, a connection between the initiator and the cap whereby the movement of the cap away from the cup actuates the initiator to activate the battery, and a releasable lock coacting with the cap in opposition to the action of the spring when compressed to prevent the movement of the cap relative to the cup.

5. The combination with a deferred-action battery having a projecting initiator the outward movement of which relative to the battery activates the battery, of a plate attached to the projecting extremity of the initiator, a compression spring interposed between the external wall of the battery and the plate to move both the plate and initiator outwardly of the battery to thereby activate the battery, and a releasable latch carried by the battery and overlying and abutting the outer face of the plate to suppress operation of the spring.

6. A lock and operating mechanism for the initiator of a power device comprising a pair of telescoping members, one member being fixedly secured to the power device and the other member being movable relative to the first member and having a depression in its outer face with an opening centrally therein for the passage therethrough of the outer end portion of the initiator, a connector between said movable member and said initiator disposed in said depression, a plug adapted to be received in the depression and overlie and enclose the outer end of the initiator and connector, a coil spring surrounding the initiator and interposed between said members, the telescoping of the members placing said spring under compression, and a releasable lock secured to the power device and operative on and against the movable member and the plug therein in opposition to the action of the compressed spring to maintain said members telescoped.

7. A lock and operating mechanism for the projecting initiator of a deferred-action battery comprising a self-contained unit adapted to be mounted externally of said battery including a pair of centrally apertured members surrounding the initiator of the battery, one member being fixedly secured to the wall of the battery and the other member being disposed above and movable relative to the fixed member and having a central depression in its outer face, a connector disposed within said depression and operative between the movable member and the initiator, a transparent plug having a groove in its inner face for the reception of said connector and adapted to seat in and fill said depression, a coil spring interposed between said members and compressed by the movement of the movable member toward the fixed member, and releasable locking latches secured to the fixed member and in engagement with the movable member and said plug in opposition to the action of the spring to maintain said spring compressed and the movable member adjacent the fixed member until said latches are released.

8. A lock and operating mechanism for a deferred-action battery having an initiating plunger projecting therefrom comprising a cup immovably mounted on the battery and concentrically surrounding the plunger, a movable cap disposed above said cup to overlie and enclose the open end thereof whereby the cup and cap cooperate to house the initiator, a connection between the cap and the plunger whereby movement of the cap away from the cup actuates the plunger to energize the battery, a compression spring interposed between said cup and cap to force the cap away from the cup, spring latches to overlie the cap and operate against the action of the spring, said latches having means at their extremities adapted to interlock and retain the latches in their operative positions, and means cooperating with the interlocked extremities of said latches to secure them one to the other, said means being removable to release said extremities thereby allowing the latches to spring to their inoperative positions and the spring to simultaneously and automatically force the cap away from the cup.

9. A lock and operating mechanism for a deferred-action battery having an initiator plunger projecting therefrom comprising a cup fixedly mounted externally on the wall of the battery concentrically about said initiating plunger, a movable cap disposed over said cup whereby the cup and cap combine to house the initiator, said cap having a concentric depression in its outer face and a central slot in the bottom thereof for the passage of the plunger, a transverse pin connecting the outer end of the plunger to the cap whereby movement of the cap outwardly from the cup concurrently pulls the plunger, a plug filling and closing the depression in the cap, the inner face of said plug being formed to accommodate the extremity of the plunger and said pin, a spring interposed between the cup and cap normally operative on the cap to move it outwardly from the cup, and releasable spring latches to hold the cap against the action of the spring.

10. A lock and operating mechanism for the projecting, initiating plunger of a deferred-action battery comprising an attachment adapted to be mounted on the battery concentrically about and housing said plunger, said attachment including a pair of relatively movable members, a connection between one of said members and the plunger whereby the movement of such member away from the other member actuates said plunger, a spring band adapted to encircle said members centrally and clampingly secure them against relative movement, a compression spring under load imposed by said band when operatively interposed between said members, and means to release said band for spontaneous relative movement of said members under the action of said spring in relieving itself.

References Cited in the file of this patent

UNITED STATES PATENTS

| | | |
|---|---|---|
| 214,173 | Molison | Apr. 8, 1875 |
| 269,179 | Cointepas | Dec. 19, 1882 |
| 362,584 | Misell | May 10, 1887 |
| 497,540 | Digiovanni | May 16, 1863 |
| 1,015,735 | Heuser | Jan. 23, 1912 |

FOREIGN PATENTS

| | | |
|---|---|---|
| 4,206 of 1875 | Great Britain | Dec. 4, 1875 |
| 1,087,673 | France | Aug. 25, 1954 |